United States Patent Office 2,956,982
Patented Oct. 18, 1960

2,956,982

STABILIZATION OF POLYETHYLENE

Marvin A. McCall and Harry W. Coover, Jr., Kingsport, Tenn., assignors to Eastman Kodak Company, Rochester, N.Y., a corporation of New Jersey No Drawing. Filed Jan. 24, 1957, Ser. No. 635,943

4 Claims. (Cl. 260—45.85)

This invention relates to an improved process for the preparation of highly polymeric polyethylene primarily employing those procedures which are well known in the art, the improvement essentially comprising introducing into the vessel in which the polymerization is performed, prior to initiating the polymerization, an alkyl or cycloalkyl diester of 3,3'-thiodipropionic acid. This process provides an improved method for incorporating a valuable stabilizer into polyethylene during the same operation which is employed for the manufacture of the polyethylene whereby the product obtained is fully equivalent in quality (and in some instances improved) as compared to polyethylene produced by the usual process without the presence of a stabilizer which has to be subsequently incorporated into the polyethylene by mechanical means.

Various stabilizers and stabilizing processes have been described in the literature for improving the physical, chemical, electrical, or weathering stability of polyethylene against deterioration resulting from aging and exposure to heat, light and/or atmospheric moisture. The stabilizers which have been disclosed include many which are phenolic in character such as 2,6-diteriarybutyl-4-methylphenol, tertiarybutyl-4-methoxyphenol, etc. However, the introduction of this general class of polyethylene antioxidants is performed after the polyethylene has been manufactured. Thus, the preparation of polyethylene according to the well-known processes such as described in U.S. Patents 2,153,553 and 2,118,565 cannot be performed in the presence of such stabilizers. As a result, it is necessary to first prepare the polyethylene and to then admix the stabilizer with the polyethylene which increases the expense of the final product.

The methods for admixing a stabilizer with polyethylene in some manner which will effect thorough distribution require expensive machinery suitable for mixing solid or liquid stabilizers with the polymer. This may be accomplished by milling the ethylene polymer with the additive on heated rolls, such as are used in compounding rubber. Other suitable milling or mixing equipment such as a Banbury mixer, can be used. The addition of the stabilizing agent has been carried out in a few cases by its addition to a solution or suspension of polymer in an organic solvent or by its addition to an aqueous dispersion; this is then followed by the removal of the dispersing medium or solvent by evaporation. All of these processes represent the addition of at least one extra processing step and therefore constitute an added expense for the final stabilized polymer.

It is an object of this invention to obtain stabilized polyethylene without the extra processing operations required in the prior art.

It is a further object of this invention to provide a stabilized polyethylene containing an alkyl or cycloalkyl diester of 3,3'-thiodipropionic acid whereby the stabilized polyethylene has improved weathering characteristics as contrasted to polyethylene containing the same antioxidant added subsequent to the polymerization reaction.

Further objects are apparent elsewhere herein.

According to a principal embodiment of this invention there is provided an improvement in the process for preparing highly polymeric polyethylene comprising heating in a reaction vessel ethylene and a peroxy catalyst at a temperature of from 40° to 350° C. and at a pressure of from 50 to 3,000 atmospheres, which improvement comprises introducing into the reaction vessel prior to initiating the polymerization reaction a stabilizing quantity of a stabilizer selected from the group consisting of the alkyl and cycloalkyl diesters of 3,3'-thiodipropionic acid wherein each of the alkyl and cycloalkyl radicals contains from 6 to 24 carbon atoms.

The quantity of the stabilizers which can be advantageously employed ranges from about 0.01% to about 2% based on the weight of the ethylene being polymerized. These quantities usually exceed the amount of peroxy catalyst used. Higher or lower quantities can also be employed.

Examples of the stabilizers which can be employed in accordance with this invention include dilauryl 3,3'-thiodipropionate, dioctodecyl 3,3'-thiodipropionate, dithiodipropionate, dioctodecyl 3,3'-thiodipropionate, dicyclohexyl 3,3'-thiodipropionate, dicetyl 3,3'-thiodipropionate, dioctyl 3,3'-thiodipropionate, di(4-ethylcyclohexyl) 3,3'-thiodipropionate, etc. Most advantageously, each of the alkyl and cycloalkyl radicals contains from 6 to 24 carbon atoms. The cycloalkyl diesters include those wherein the esters are derived from cyclohexyl alcohol or lower alkyl substituted cyclohexyl alcohols wherein the alkyl substituents contain from 1 to 18 carbon atoms. Of course, alkyl or cycloalkyl esters containing less than 6 carbon atoms or more than 24 carbon atoms can also be employed. However, most advantageous results are obtained employing those esters containing at least 10 carbon atoms in a straight chain or a cycloalkyl ester. The use of these stabilizers results in an especially high degree of compatibility and they are especially preferred.

The working Examples 1a, 2 and 3a show that those esters containing alkyl radicals having 12 and 18 carbon atoms are particularly illustrative of the invention, hence a range of 12 to 18 carbon atoms covers particularly advantageous embodiments of this invention.

The general methods for the polymerization of ethylene for which this invention provides an improvement are those methods concerned with free radical initiated polymerization. U.S. Patents 2,153,553 and 2,188,465, illustrate processes of this class although it is not intended that this invention be restricted to the processes disclosed therein. Since these two patents have been granted, numerous patents have issued relating to modifications and improvements. It is believed that these various processes and numerous ramifications and modifications thereof can be summarized by referring to them as processes comprising heating in a reaction vessel ethylene and a peroxy catalyst at a temperature of from 40° to 350° and at a pressure of from 50 to 3,000 atmospheres. While the present invention produces useful results when employed in processes for making low molecular weight or waxy polymers of ethylene, this invention is more particularly concerned with the production of highly polymeric high molecular weight plastic grades of polyethylene which have improved physical, chemical and electrical stability.

As mentioned above, the improved process of this invention provides for the preparation of a polyethylene which has excellent stability during weathering and as a consequence the stabilized polyethylene produced from the polymerization processes of this invention is of superior value in the preparation of materials to be used for electrical purposes where the uniformity of characteristics is quite important over considerable periods of time and under variable conditions. Thus, electrical insulators in electronic devices are alternately subject to heating and cooling while the equipment is in operation or turned off. Electronic equipment used by the armed forces may be subjected to further extremes in temperatures and climates varying from tropical to arctic and from sea level to extremely high altitudes. Uniformity of characteristics is obviously of considerable value.

In accordance with the preferred embodiment of this invention the stabilizer is mixed with the peroxide catalyst which is used to initiate the polymerization and the remainder of the polymerization process is then carried out in the customary manner well known in the art. In this way, the polyethylene which is formed in the presence of the stabilizer is very thoroughly admixed with stabilizer. Since peroxy compounds and phenolic compounds are generally incompatible under polymerizing conditions, this invention is especially advantageous in that it provides a stabilizer which is compatible with the peroxy compound being used to catalyze the polymerization.

The discovery described herein that certain stabilizers can be added to the polymerization reactor without stopping the polymerization process or without causing a deleterious effect on the product is surprising in view of the known literature. For example, oxidative degradative processes are generally described as free radical processes catalyzed by heat and light. Antioxidants are generally described as free-radical stoppers and it is such stopping characteristics of antioxidants and related stabilizers that are believed to be effective in inhibiting oxidative degradation; see "Polymer Degradation Mechanisms," National Bureau of Standards Circular 525 (1953) pages 137–158. Therefore, it would normally be expected that the common well known stabilizers or antioxidants would inhibit or prevent any polymerization process which is a free-radical process. As mentioned above, this is the case with most stabilizers; however, the present invention provides an unexpected exception.

In order to illustrate how some of the known stabilizers of the prior art perform when introduced into the reaction vessel at the beginning of the polymerization of ethylene, the following examples are presented:

*Example A*

2,6-ditert-butyl-p-cresol (0.05 g. or 500 p.p.m. based on autoclave free space) and ½ ml. of mineral oil containing ditert-butyl peroxide (0.009 g. or 90 p.p.m.) were placed in a stainless steel autoclave (100 cc. capacity). The autoclave was purged with ethylene to remove any residual air and then filled to a pressure sufficient to give 15,000 p.s.i. at 150° C. This temperature and pressure was maintained for two hours. There was no product formed showing that this cresol had completely inhibited the polymerization at this concentration. Comparable runs containing no 2,6-ditert. butyl-p-cresol yielded approximately 15 to 20 g. of polyethylene.

*Example B*

When 2,6-di-tert-butyl-p-cresol was used as in Example A but in very low concentrations (0.002 g. or 20 p.p.m. based on autoclave free space) with ½ ml. of mineral oil containing ditert-butyl peroxide (0.009 g. or 90 p.p.m.), the yield of polymer was only 9.1 g.

*Example C*

Tert-butylhydroxyanisol (BHA) (0.05 g. or 500 p.p.m. based on autoclave free space) and ½ ml. of mineral oil containing ditert-butyl peroxide (0.009 g. or 90 p.p.m.) were placed in a stainless steel autoclave (100 cc. capacity). The autoclave was purged with ethylene to remove any residual air and then filled to a pressure sufficient to give 15,000 p.s.i. at 150° C. This temperature and pressure was maintained for two hours. There was no product formed showing that this phenolic antioxidant (BHA) had completely inhibited the polymerization at this concentration. At lower concentrations of BHA (0.002 g. or 20 p.p.m.), the yield of product was 0.80 g. At 200 p.p.m. of Tenox BHA no product was obtained, which shows the inhibiting effects of this phenolic material.

*Example D*

When 2,2'-methylene bis(4-methyl-6-(1-methylene) cyclohexyl phenol) (Nonox WSP) was used as the antioxidant additive (0.05 g. or 500 p.p.m. concentration) with ditert-butyl peroxide catalyst (0.009 g. or 90 p.p.m.) under conditions used in Example A, no product was obtained.

*Example E*

When 4,4'-thiobis-(6-tert-butyl-m-cresol), Santowhite crystals was used in concentrations as high as 200 p.p.m. with di-tert-butyl peroxide (90 p.p.m.) as in Example A, the polymerization was completely inhibited. When this phenolic antioxidant was used in concentrations as low as 40 p.p.m., the yield of product was only 3 grams instead of the expected 15–20 g.

The use of 2,6-ditert. butyl-p-cresol (see Example A) has been disclosed in the prior art as useful in the preparation of polyethylene in a particular manner wherein this compound functions during the polymerization process as a chain transfer agent. The esters of thiodipropionic acid contemplated by this invention are not phenolic materials and are obviously not intended to serve as chain transfer agents since they have little or no effect upon the yield, melting point or molecular weight of the polymer being produced. The stabilizers employed in the process of the present invention remain unchanged during the polymerization process. Their only effect appears to be an upgrading of the polyethylene; they have no adverse reactivity with the catalyst and they produce no significant effect upon the polymerization reaction. Any prior art which refers to the employment of a phenolic compound during the preparation of polyethylene is not concerned with any antioxidant properties of the phenolic material since the phenolic material is not preserved as such during the course of the reaction and does not serve as a stabilizer in the product produced. In further explanation of the difference between employing phenolic materials in the preparation of polyethylene and those stabilizers of the present invention, it is important to note that the use of phenolic materials in amounts equivalent to or exceeding the catalyst concentration generally results in neutralizing the catalytic action and greatly inhibits or completely stops the polymerization. Thus, the use of such quantities of phenolic compounds as might conceivably serve as antioxidants would generally yield low molecular weight or waxy polymers or no solid polymer at all. The present invention provides a process wherein any proportion of an ester of 3,3'-thiodipropionic acid can be employed. As previously discussed above, this invention is concerned with the improved process of obtaining a stabilized product in a manner which requires the omission of an expensive and time-consuming operation, which omission was most unexpectedly possible. Moreover, this invention provides products which, even more surprisingly, are less susceptible to oxidative deterioration than those products produced by following the techniques known in the art.

This invention can be further illustrated by the following examples of preferred embodiments although it will be understood that these examples are included merely for purposes of illustration and are not intended to limit the scope of the invention unless otherwise specifically indicated:

*Example 1a*

Dilauryl-3,3'-thiodipropionate (0.05 g. or 500 p.p.m. based on autoclave free space) and ½ ml. of mineral oil containing ditert. butyl peroxide (0.009 g. or 90 p.p.m. based on autoclave free space) were placed in a stainless steel autoclave (100 cc. capacity). The autoclave was purged with ethylene to remove any residual air and then filled to a pressure sufficient to give 15,000 p.s.i. ethylene at 150° C. This temperature and pressure was maintained for 2 hours. The yield was 25.0 g. polyethylene, inherent viscosity 1.13, molecular weight about 33,900, and density .920. Thin plates 1/16 inch thick, after exposure in the Weather-Ometer for 2,000 hours, were still flexible and showed little surface deterioration or cracking.

*Example 1b*

One-half ml. of mineral oil containing ditert. butyl peroxide (0.009 g. or 90 p.p.m. based on autoclave free space) was placed in a stainless steel autoclave (100 cc. capacity). The autoclave was purged with ethylene and filled to an ethylene pressure sufficient to give 15,000 p.s.i. at 150° C. The charging and operating procedure was identical to that described in Example 1a above except that no antioxidant was used. The yield was 20.0 g. polyethylene, inherent viscosity 1.16, molecular weight about 35,000. Thin plates 1/16 inch thick, after exposure in the Weather-Ometer for 2,000 hours, were quite brittle and stiff compared to the product in Example 1 above. The surface was covered with very fine cracks.

*Example 2*

Distearyl 3,3'-thiodipropionate (0.05 g. or 500 p.p.m. based on autoclave free space) was placed in a stainless steel autoclave (100 cc. capacity). The autoclave was purged with ethylene and filled to an ethylene pressure sufficient to give 15,000 p.s.i. at 150° C. This temperature and pressure was maintained for 2 hours. The yield was 20.0 g. polyethylene; inherent viscosity, 1.12; molecular weight, approximately 33,000; and density, 0.92. Thin plates 1/16 inch thick, after exposure in the Weather-Ometer for 3,000 hours, were still flexible and showed little surface deterioration or cracking. The inherent viscosity after weathering was 1.0.

*Example 3a*

Dilauryl-3,3'-thiodipropionate (0.05 g. or 500 p.p.m. based on autoclave free space) and 1¼ ml. of mineral oil containing diethyl-2,2'-azobis(2-methylpropionate) (0.022 g. or 220 p.p.m. based on autoclave free space) were placed in a stainless steel autoclave (100 cc. capacity). The autoclave was purged with ethylene to remove any residual air and then filled to a pressure sufficient to give 15,000 p.s.i. ethylene at 100° C. This temperature and pressure was maintained for 2 hours. The yield was 10 g. polyethylene, inherent viscosity 1.49, molecular weight 52,970, and density 0.932. Thin plates 1/16 inch thick, after exposure for 2,000 hours in the Weather-Ometer, were still flexible and showed only minor surface cracks.

*Example 3b*

The procedure including the catalyst was repeated exactly the same as that described above in Example 3a except that no dilauryl-3,3'-thiodipropionate was used. The yield was 9.0 g. polyethylene, inherent viscosity 1.54, molecular weight 55,960, and density 0.931. Thin plates 1/16 inch thick, after exposure for 2,000 hours in the Weather-Ometer, were brittle and dark in color compared with those obtained in Example 3a above.

For purposes of comparison, 350 g. of commercial polyethylene (molecular weight 33,500) containing no antioxidant was milled on hot rolls (145° C.) while 0.7 g. (0.2%) of dilauryl-3,3'-thiodipropionate was added. The milling was continued for 15–20 minutes to insure complete and thorough mixing. This conventionally stabilized polyethylene was then compared with the results obtained in the above examples. In each case thin plates 1/16 inch thick were prepared from the materials obtained above and exposed in the Weather-Ometer for 2,000 hours. The change in inherent viscosity on exposure to the oxidative conditions of the Weather-Ometer is given in the table below. The inherent viscosities were determined in hot (100° C.) tetralin solutions (0.25%). The results show the effectiveness of the stabilization process as illustrated in Examples 1a and 2 and 3a over unstabilized polyethylene prepared in Examples 1b and 3b. The polyethylene prepared according to this invention is also shown to have a stability equal or surpassing that prepared by the conventional process of blending the antioxidant with the molten polyethylene. Stabilized polyethylenes prepared by the process of this invention have the advantage that very thorough dispersions of the antioxidant are easily obtained without the added processing step which requires milling, blending, or mixing molten polyethylene with the antioxidant.

INHERENT VISCOSITY DETERIORATION DUE TO ACCELERATED WEATHERING FOR 2000 HOURS [1]

| Polyethylene Composition | | | Initial Inherent Viscosity | Inherent Viscosity After Weathering | Change in Inherent Viscosity |
|---|---|---|---|---|---|
| Example No. | Mol. Wt. | Wt. Percent of Antiox. | | | |
| 1a | 33,900 | 0.2 | 1.13 | 1.00 | −0.13 |
| 1b | 35,000 | none | 1.16 | 0.70 | −0.46 |
| 2 | 33,000 | 0.25 | 1.12 | 1.00 | −0.12 |
| ([2]) | 33,500 | 0.2 | 1.10 | 0.95 | −0.15 |
| 3a | 52,970 | 0.5 | 1.49 | 1.35 | −0.14 |
| 3b | 55,960 | none | 1.54 | 0.90 | −0.64 |

[1] The apparatus used in conducting the tests described herein is designed to simulate natural weathering conditions caused by water and sunlight (alternate wetting and drying under exposure to radiation from a carbon arc) on an accelerated basis and is made by the Atlas Electric Devices Co., Chicago, Illinois, under the name "Weather-Ometer."

[2] This is the conventionally stabilized polyethylene composition described above which is obtained by milling dilauryl thiodipropionate with polyethylene on heated rolls.

It is apparent from the table presented above that the deterioration of polyethylene stabilized in accordance with the teachings of this invention was not only minor (less than 20%) but was even less than for polyethylene stabilized by a conventional process for blending it with an antioxidant as described for comparative purposes.

In addition to the employment of those esters of 3,3'-thiodipropionic acid illustrated in the above examples, similar results can be obtained employing dicetyl 3,3'-thiodipropionate dicyclohexyl 3,3'-thiodipropionate, etc. As is evident herein, the term "alkyl" includes cycloalkyl as well as branched chain alkyl radicals.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A process for preparing solid, highly polymeric, stabilized polyethylene comprising heating in a reaction vessel at from 40° to 350° C. under from 50 to 3,000 atmospheres of pressure the following materials which constitute substantially the entire initial contents of said reaction vessel (1) ethylene, (2) as a stabilizer from 0.01 to 2% based on the weight of the polyethylene to be produced of at least one alkyl diester of 3,3'-thiodipropionic acid wherein each alkyl radical contains from 12 to 18 carbon atoms, and (3) an amount less than the amount of said stabilizer of a peroxy catalyst.

2. A process as defined in claim 1 wherein said stabilizer is dilauryl 3,3'-thiodipropionate.

3. A process as defined in claim 1 wherein said stabilizer is distearyl 3,3'-thiodipropionate.

4. A process as defined in claim 1 wherein the polyethylene produced is characterized by having an inherent viscosity which decreases by no more than about 20% after 2,000 hours exposure in an accelerated weathering device which subjects samples of the polyethylene to alternate wetting and drying under exposure to radiation from a carbon arc simulating sunlight.

References Cited in the file of this patent

UNITED STATES PATENTS

| | | |
|---|---|---|
| 2,188,465 | Perrin et al. | Jan. 30, 1940 |
| 2,519,755 | Gribbins | Aug. 22, 1950 |
| 2,568,902 | Thompson et al. | Sept. 25, 1951 |